2 Sheets—Sheet 2.
R. BROWN & W. HOUSTON.
Corn-Planter.
No. 199,783. Patented Jan. 29, 1878.
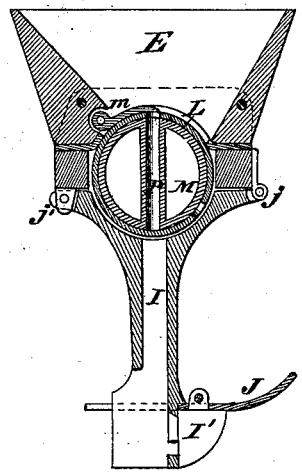
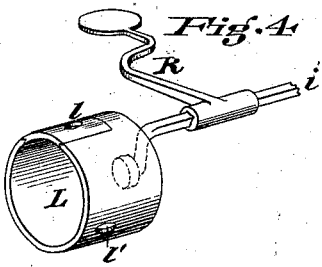
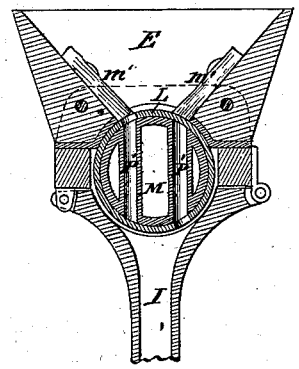
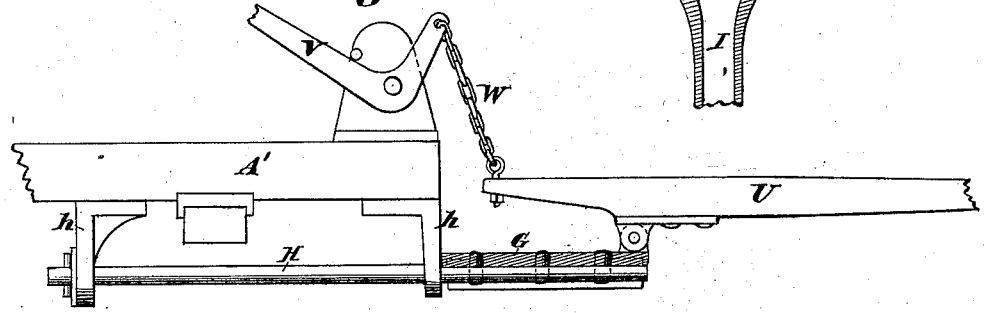

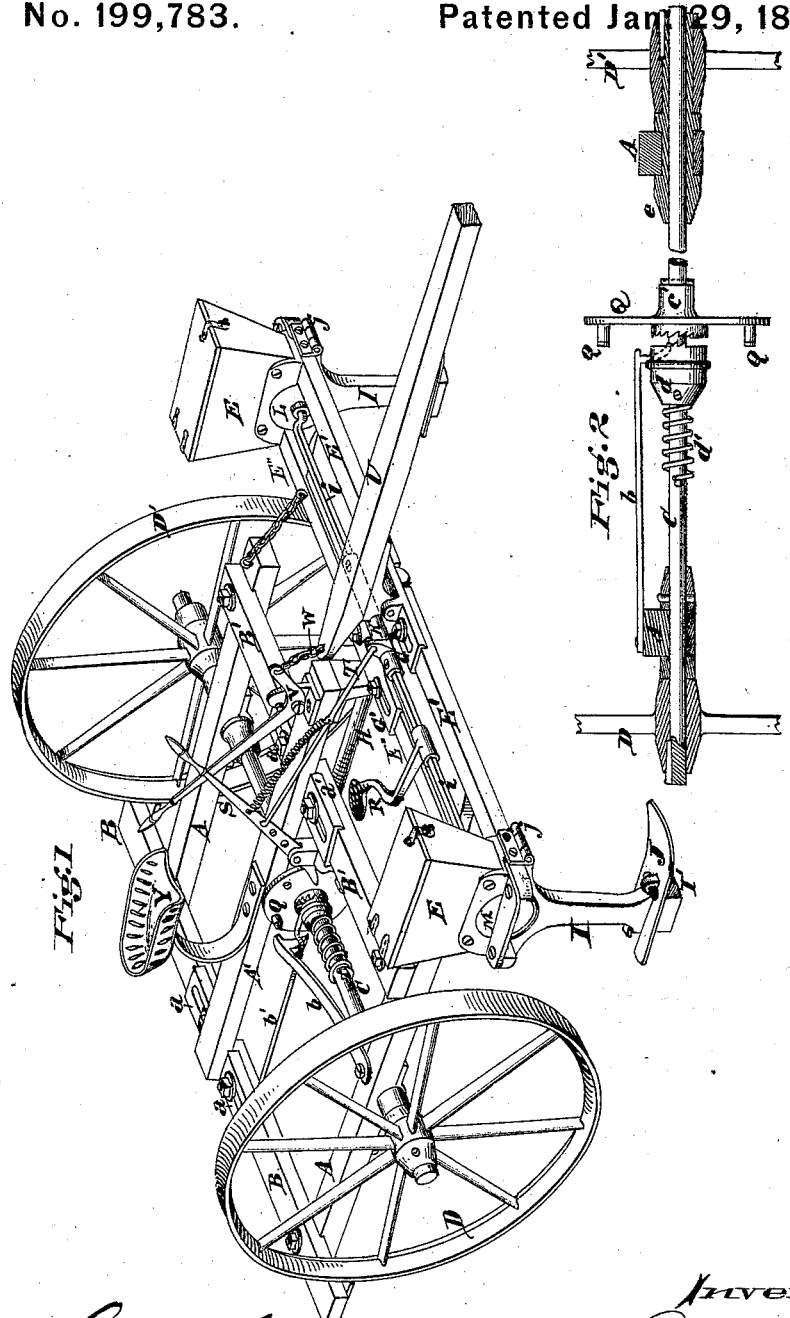

UNITED STATES PATENT OFFICE.

ROBERT BROWN AND WILLIAM HOUSTON, OF DAYTON, OHIO.

IMPROVEMENT IN CORN-PLANTERS.

Specification forming part of Letters Patent No. 199,783, dated January 29, 1878; application filed August 24, 1877.

*To all whom it may concern:*

Be it known that we, ROBERT BROWN and WILLIAM HOUSTON, of Dayton, in the county of Montgomery and State of Ohio, have invented certain new and useful Improvements in Corn-Planters, of which the following is a specification:

Our invention relates to a double planter, primarily designed for planting in drills automatically, but is also adapted for check-row planting by hand.

The invention consists of a novel combination and arrangement of parts, which will be fully hereinafter described.

Figure 1 is a perspective view of a planter containing the invention. Fig. 2 is a front view, partly in section, illustrating the means for journaling the axle of the ground-wheels, &c. Figs. 3 and 5 are vertical sections through the center of the seed-box and dropper-cylinder. Fig. 4 is a perspective view of the feed-cylinder; and Fig. 6 is a side elevation of the coupling-shaft and the means for elevating the hoes, partly in section.

A A represent the two side beams of the main frame, and A' the center one. To this center beam are securely attached two slotted pieces, $a$ $a'$, preferably made of metal, with downward-projecting flanges at their sides, within which the transverse pieces B B' of the frame fit, and to which they are secured by bolts passing through said slots.

The right-hand wheel D is socketed upon a square arbor of the shaft C, or keyed so as to revolve with it. The sleeve $d$ slides on a fast feather on the shaft, and is made to engage with the clutch or gland C', which is firmly keyed to the shaft by means of the spring $d'$. A reversal of the motion of wheel D disconnects the power from the gland, which may also be done by pressure on the foot-lever $b$, a projection on the end of which engages with a shifter-rod, $b'$.

The sleeve or axle-box $e$ of the left-hand wheel D' is journaled to the side beam, and extends toward the center of the machine in the form of a sleeve sufficiently far to allow the widening of the machine as desired, and yet to form a journal-bearing for the shaft.

E E represent the seed-boxes, which are mounted on an independent frame, E' E'', which, for the purpose of draft, is loosely connected to the main frame at each side by chains, as shown in Fig. 1, and at the center by a coupling-rod, H. To the front end of this coupling-rod is rigidly attached a plate, G, extended laterally with downward-projecting flanges, within which the pieces E' fit, and to which they are secured by bolts passing through slots in said plate G. The rear bar E'' of the dropper-frame is also of two pieces, coupled by slotted plate G'.

The coupling H passes through hangers $h$ $h$ attached to the beam A', where it is secured by a pin.

This invention permits the double dropper-frame to keep level, so that the dropper will always be at an equal distance from the ground, notwithstanding the wheels might pass over stones, stumps, or other obstructions, and thus the seed-hills will be at an equal distance apart, the seed from each dropper having an equal distance to fall, and therefore reaching the ground at the same time.

$i$ $i$ represent the crank-shaft of the feed-wheels. It is made in two pieces, connected by the sleeve K, the shaft being square or provided with a fast feather, so that the length of the shaft may be varied.

I represents the seed-spouts, which are preferably made of cast metal, and sufficiently strong to carry the furrow-openers. They are hinged at $j$, being secured in position by a lock-pin at $j'$. Whenever desirable in traveling, the shoes can be turned up out of danger.

The point I' of the furrow-opener is made separate, so that it may be of hard metal, sharpened or renewed at pleasure. It is provided with a flaring tenon, which fits into a receding slot in seed-spout I.

When the shoe-guard J is keyed in position, as shown, it and the dovetail unite in holding the point and shoe firmly in their relative positions.

L represents the feed-cylinder, provided with a carrying-cell, $l$, in a removable plate, which may be changed for another with a hole to suit the kind of seed to be dropped. Within the feed-cylinder is a stationary cylinder, with one tube, P, connecting the receiving and discharging apertures, as shown in Fig. 3, or two such tubes, P' P', as shown in Fig. 5. In Fig. 3 a hinged cut-off, m, is shown; but any suitable device may be employed.

T is a rod, pivoted to a crank on the shaft-sleeve K at one end and to the lever S at the other, a spring being also employed, as shown.

Q represents studs on the disk of clutch C'. The dropping mechanism can be thrown out of gear by pressure on either of the foot-levers b or R, or by the hand-lever S. The tongue U is pivoted to the plate G, with a rear extension, which is connected to a crank-lever, V, by a chain, W. By the use of this lever, assisted by the weight of the driver in seat Y, the front of the machine can easily be elevated so that the shoes will clear the ground.

The front frame and crank-shaft having been adjusted to the width it is desired to have the rows apart, we prefer to adjust the rear frame and axle so that the ground-wheels will follow the path of the furrow-openers and act as coverers; but whenever it is preferred not to have the ground-wheels run over the seed, either frame may be adjusted independently of the other, so that the seed may be dropped either inside or outside of the path of the wheels, and covering-shares may be attached, if desired.

The operation of automatic planting with the single dropper, Fig. 3, is as follows: The crank-shaft being in the position shown in Fig. 1, the seed-carrying cell $l$ of the cylinder L will be at the front side of the bottom of the seed-box, and when the stud Q revolves it will strike the foot of the lever S, and through it and the rod T and the shaft $i$ transmit motion to the seed-cylinder, which will revolve around the stationary cylinder M until the cell $l$ comes over the tube P, as shown in Fig. 3, when the load of seed will be discharged into said tube, and there remain until the spring returns the seed-cylinder and lever S to the position from which they started, at which position the discharge-aperture $l'$ is under the tube P, and the seed drops into spout I, and from thence to the ground. The cylinder, thus oscillating, continues to fill its seed-cell and carry the seed to the tube or receiver P at the same time that it drops the preceding load into the conduit-spout.

The only difference between this and the double dropper shown in Fig. 5 is that in the latter there are two tubes in the stationary cylinder, and the reciprocating cylinder L at each movement drops a load.

The distance between seeds in a row will depend on the distance between the studs Q, and these may be regulated at pleasure. The operation may be performed in like manner by hand by simply disconnecting the clutch $d$ and using the lever S, and when so used it is obvious that the seed may be dropped in hills or drills, as desired.

One advantage of retaining the seed within the cylinder is that it has not so far to drop to the ground, and is much less liable to fall irregularly; and one advantage of the dropper being a complete cylinder is that it acts as a cut-off to retain the seed within the stationary cylinder, thus avoiding valves of any kind.

Having thus described our invention, what we claim as new and desire to secure by Letters Patent, is—

1. In an expansible corn-planter, the combination of the rear and front body-beams B B', the slotted plates $a\ a'$, to which the said beams are adjustably connected, the dropper-supporting beams E' E'', the slotted plates G G', to which the latter are adjustably attached, the axle C, and the sleeve $e$, forming a bearing for the axle and the side-beam A of the machine, and carrying the wheel D', said sleeve being adjustable upon the axle, substantially as described.

2. In a corn-planter, the oscillating feed-cylinder L, provided with a carrying-cell, $l$, and a discharge-aperture, $l'$, and arranged to act as a cut-off to the tubes P or P', as and for the purpose set forth.

3. The distributing-cylinder L, provided with interchangeable sliding dovetailed plates having carrying-cells of different sizes, in combination with the inner cylinder, having tubes P or P', for the purpose set forth.

4. The furrow-opener I', having a rear flaring tenon fitting a corresponding slot in the foot of the seed-spout, in combination with the shoe J, keyed to said spout, substantially as described.

In testimony whereof we have hereunto set our hands this 18th day of August, 1877.

ROBERT BROWN.
WILLIAM HOUSTON.

Witnesses:
O. M. GOTTSCHALL,
GEO. R. YOUNG.